(12) United States Patent
Jones et al.

(10) Patent No.: US 7,812,613 B2
(45) Date of Patent: Oct. 12, 2010

(54) SYSTEM AND METHOD FOR MONITORING ELECTROLYTE LEVELS IN A BATTERY

(75) Inventors: Duncan Jones, Manchester (GB); John Worthingdon, Rochdale (GB)

(73) Assignee: Philadelphia Scientific, Montgomeryville, PA (US)

( * ) Notice: Subject to any disclaimer, the term of this patent is extended or adjusted under 35 U.S.C. 154(b) by 480 days.

(21) Appl. No.: 10/866,862

(22) Filed: Jun. 14, 2004

(65) Prior Publication Data
US 2005/0001628 A1  Jan. 6, 2005

Related U.S. Application Data

(60) Provisional application No. 60/477,989, filed on Jun. 12, 2003, provisional application No. 60/484,855, filed on Jul. 3, 2003.

(51) Int. Cl.
G01N 27/41 (2006.01)
G08B 21/00 (2006.01)
H01M 10/48 (2006.01)

(52) U.S. Cl. .................. 324/426; 324/425; 429/91; 429/61; 340/620

(58) Field of Classification Search .......... 320/112, 320/132; 324/425, 426, 429, 437; 429/89, 429/91, 61; 340/620
See application file for complete search history.

(56) References Cited

U.S. PATENT DOCUMENTS

| | | | | |
|---|---|---|---|---|
| 3,891,465 A | * | 6/1975 | Muto et al. | 429/61 |
| 4,053,686 A | * | 10/1977 | Oxenreider | 429/91 |
| 4,184,011 A | * | 1/1980 | Strazewski | 429/91 |
| 4,247,811 A | * | 1/1981 | Findl | 320/134 |
| 4,353,245 A | * | 10/1982 | Nicolai | 73/49.2 |
| 4,388,584 A | * | 6/1983 | Dahl et al. | 320/126 |
| 4,536,757 A | * | 8/1985 | Ijntema | 340/636.15 |
| 4,562,127 A | * | 12/1985 | Mangone | 429/89 |
| 4,768,377 A | | 9/1988 | Habelmann | |
| 5,394,344 A | * | 2/1995 | Lippmann et al. | 702/50 |

(Continued)

FOREIGN PATENT DOCUMENTS

DE  200 14 429 U1  1/2001

(Continued)

OTHER PUBLICATIONS

European Search Report Dated Jan. 2, 2007 for related EP application 04 776 510.2-2207.

(Continued)

*Primary Examiner*—Edward Tso
*Assistant Examiner*—Alexis Boateng
(74) *Attorney, Agent, or Firm*—Fox Rothschild LLP

(57) ABSTRACT

A measuring device is used in conjunction with a programmable controller for monitoring electrolyte levels in the battery. According to one implementation, the measuring device is located in a battery and is configured to detect when the electrolyte level in the battery falls below a particular level. The controller is in electrical communication with the electrolyte detection device. The controller is configured to: (i) receive a signal from the electrolyte level detection device indicating when the electrolyte level in the battery has fallen below the particular level; (ii) introduce a wait-period after the signal is received; and (iii) enable an indicator to indicate that the electrolyte level in the battery should be refilled when the wait-period expires.

17 Claims, 4 Drawing Sheets

U.S. PATENT DOCUMENTS

| | | | |
|---|---|---|---|
| 5,422,822 A * | 6/1995 | Toyota et al. | 702/63 |
| 5,773,962 A | 6/1998 | Nor et al. | |
| 5,841,357 A * | 11/1998 | Henry et al. | 340/636.13 |
| 5,936,382 A * | 8/1999 | Jones et al. | 320/132 |
| 6,313,611 B1 * | 11/2001 | Mowry et al. | 320/136 |
| 6,653,843 B2 * | 11/2003 | Whitchurch | 324/446 |

FOREIGN PATENT DOCUMENTS

| | | |
|---|---|---|
| DE | 10038792 | 1/2002 |
| EP | 0791809 | 8/1997 |
| GB | 2055208 | 2/1981 |
| JP | 58 059568 | 4/1983 |
| JP | 58059568 | 8/1983 |
| WO | 00/35040 | 6/2000 |

OTHER PUBLICATIONS

Communication dated Feb. 20, 2006 issued in related European application.

* cited by examiner

SYSTEM AND METHOD FOR MONITORING ELECTROLYTE LEVELS IN A BATTERY

CROSS-REFERENCE TO RELATED APPLICATIONS

The present patent application claims benefit of U.S. Provisional Application Ser. Nos. 60/477,989 and 60/484,855 filed on Jun. 12, 2003 and Jul. 3, 2003, respectively. The contents of the aforementioned applications are fully incorporated by reference herein.

TECHNICAL FIELD

The present invention relates to batteries, and more specifically, to monitoring electrolyte levels in batteries.

BACKGROUND

Many industrial batteries, for example fork truck batteries, contain an electrolyte solution used for storing and conducting electrical power. Over time water in the electrolyte solution evaporates from the battery causing the electrolyte solution level (the "electrolyte level") to fall. If the electrolyte level falls below a minimal acceptable level in a battery, serious problems can occur to the battery such as reduced electrical power output and/or permanent damage. For example, if the electrolyte level drops below the top edge of a negative plate in the cell of a battery, the negative plate is exposed to air, which rapidly causes the negative plate to oxidize.

To address this problem, numerous devices have been proposed for monitoring the electrolyte level in the battery to ensure that the water is replenished before the electrolyte level drops below the minimal acceptable level. For instance, devices mounted outside the cell of a battery that indicate when the electrolyte level is low are now in common use, see e.g., U.S. Pat. No. 5,936,382, entitled Battery Electrolyte Level Monitor, issued Aug. 10, 1999, incorporated herein by reference. The common principle for most of these devices is a metal probe inserted through the cover of a pilot cell in the battery. Typically, when the tip of the probe touches the electrolyte, the probe sends a signal (via electrical circuitry) to an indicator, such as an alarm or a light, indicating that the electrolyte level in the battery is satisfactory. On the other hand, when the electrolyte level drops below the tip of the probe, it sends another signal to the indicator that the time for re-watering the battery is imminent.

One drawback with these probe-based devices is they cannot easily read the electrolyte level below the top edges of battery separators. Separators are porous plastic sheets that keep the plates apart electronically, but permit ionic current flow between them. If the metal tip of the probe should touch the wet separator in general, or have any ionic contact with the separator whatsoever, for example through a droplet of electrolyte, or tarry substance, or wet particulate matter, etc., then this may cause the probe to continue sending a signal indicating that the electrolyte level is satisfactory, even though the electrolyte may have fallen below the acceptable level. In other words, the probe causes the indicator to illicit a false indication that the electrolyte level is satisfactory, when in fact, it is too low.

As a result, most battery manufacturers have kept their probe tips above the separators and require watering more frequently than is actually needed. However, now there is a demand for batteries that are designed for very low maintenance, i.e., very long watering intervals. That is, there is a desire to allow the electrolyte levels to drop to a level that is well below the level of the separators, such as to the tops of the plates.

To make the probes more accurate at measuring the electrolyte levels below the separators without touching them, a mechanical "spreader" or shield is used to wedge the separators apart so that the probe can descend between them without touching them or having any ionic tracking paths to the separators.

One limitation with this mechanical solution is the tight tolerances involved. For example, the separators even in a large battery cell may be only a few millimeters apart, and much less on smaller cells. Therefore, the risk of ionic contact with the separators is quite high, which results in a false signal.

Still another limitation with spreader designs is that a hole must be provided in the cell's cover which is aligned perfectly above the positive plate; otherwise, the probe will not fit precisely and may damage the separators. Existing punch-out holes in many batter cell covers, used routinely for level probes—generally do not line up with the plates and cannot be used in conjunction with the spreader designs. The result is a second set of holes must be drilled into the cell covers, which adds labor cost and inconvenience. Thus, there is currently no inexpensive and accurate way to measure electrolyte levels in batteries once the electrolyte levels fall below the top of the separators.

Another drawback associated with current probe designs is their failure to recognize when the electrolyte level in a battery cell falls below the level of the probe. Many times an indirect current path can still exist from the tip of the probe, along the length of the probe, around the inside of a battery cell and finally down the cell wall to the lowered electrolyte level. Although this path is of a higher resistance than a direct current path from the probe tip submerged in the electrolyte, the indirect current path may still cause a false indication.

SUMMARY

A system and method for monitoring electrolyte levels in a battery is described. According to one implementation, the system comprises a measuring device and a controller. The measuring device is located in a battery and is configured to detect when the electrolyte level in the battery falls below a particular level. The controller is in electrical communication with the measuring device. The controller is configured to: (i) receive a signal from the measuring device indicating when the electrolyte level in the battery has fallen below the particular level; (ii) introduce a wait-period after the signal is received; and (iii) enable an indicator to indicate that the electrolyte level in the battery should be refilled after the wait-period expires.

The following description, therefore, introduces the broad concept of using a measuring device, such as a probe-based system, in conjunction with a programmable controller for monitoring the electrolyte level in a battery. The controller is configured to introduce a wait-period after receiving a signal from a measuring device indicating that the electrolyte level in a battery cell has fallen below a particular level, e.g., a level above one or more separators in the battery cell. The wait-period is intended to coincide with an approximate time it takes the electrolyte level to fall from the particular level above the separators to a level below the separators but above the top of plates in the battery cell. The controller introduces the wait-period without having to physically measure the electrolyte level, after the electrolyte level drops below the top of the separators in the battery cell. Accordingly, the controller waits for the wait-period to expire before enabling an indicator (e.g., an alarm, a light, a message, etc.) to indicate that the battery should be refilled.

The controller also eliminates the need to physically insert a measuring device below the separators where there is a high likelihood of touching the separators or making ionic contact with them. That is, the novel systems and methods described herein are able to provide an indication of the electrolyte level below the separators without a risk of touching the separators or making ionic contact with them. As such, a probe can be inserted in standard punch-out holes provided in the casing of the battery. No drilling or lining-up of the probe with the plates is required, reducing labor costs and inconveniences associated with painstakingly attempting to insert the probe between the separators as may be the case with conventional solutions as described above in the Background.

According to another implementation, the electrolyte level in a battery is monitored when fluid is being added to the battery, i.e., the battery is being refilled. When the electrolyte level rises to a particular level a refill-wait-period is introduced. If the electrolyte level is detected to remain at the particular level for the duration of the refill-wait-period, then an indicator is enabled indicating that the electrolyte level in the battery has reached at least a desired level. The refill-wait-period is programmable duration that may be used to account for accidental splashing of fluids on a measuring device that performs level detection of the electrolyte when refilling the battery with fluid.

According to still another implementation, the electrolyte level is monitored in a battery to detect when the electrolyte level falls below a particular level. A first wait-period is introduced when the electrolyte level in the battery is detected to have fallen below the particular level. The electrolyte level is then monitored to detect whether it rises back above the particular level during the first wait-period. If the electrolyte level in the battery does rise above the particular level during the first wait-period, then the first wait-period is reset. However, if the electrolyte level in the battery does not rise above the particular level during the first wait-period, then a second wait-period is introduced after the first wait-period expires. When the second-wait period expires, an indicator is enabled indicating that the electrolyte level in the battery should be refilled.

The first wait-period may account for situations when the battery probe temporarily emerges from the electrolyte, such as when the battery is in motion or tilted on an angle. To ensure that this does not cause a false indication that the battery needs to refilled, the first wait-period is continually reset each time the probe reenters the electrolyte. Only after the first wait-period expires before being reset, i.e., when the probe remains emerged from the electrolyte for the duration of the first-wait period, is the second-wait period initiated.

According to yet another implementation, a power management system is used to control power supplied to a probe. The system selectively energizes and de-energizes the probe over time. When the probe is energized, a high current is supplied to the probe to reduce the probability of a false connectivity indication that the probe is submerged in electrolyte, when in fact the electrolyte is below the probe. Periodically, switching between the energized and non-energized states enables the overall average current draw to remain relatively low over time despite supplying a high current to the probe. The relatively high current enables the current draw between direct and indirect paths to be large and easily distinguishable, increasing the accuracy of electrolyte level detection without incurring a penalty for using a higher current.

This and other implementations will be described below when read in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Exemplary Battery

Figure 1:
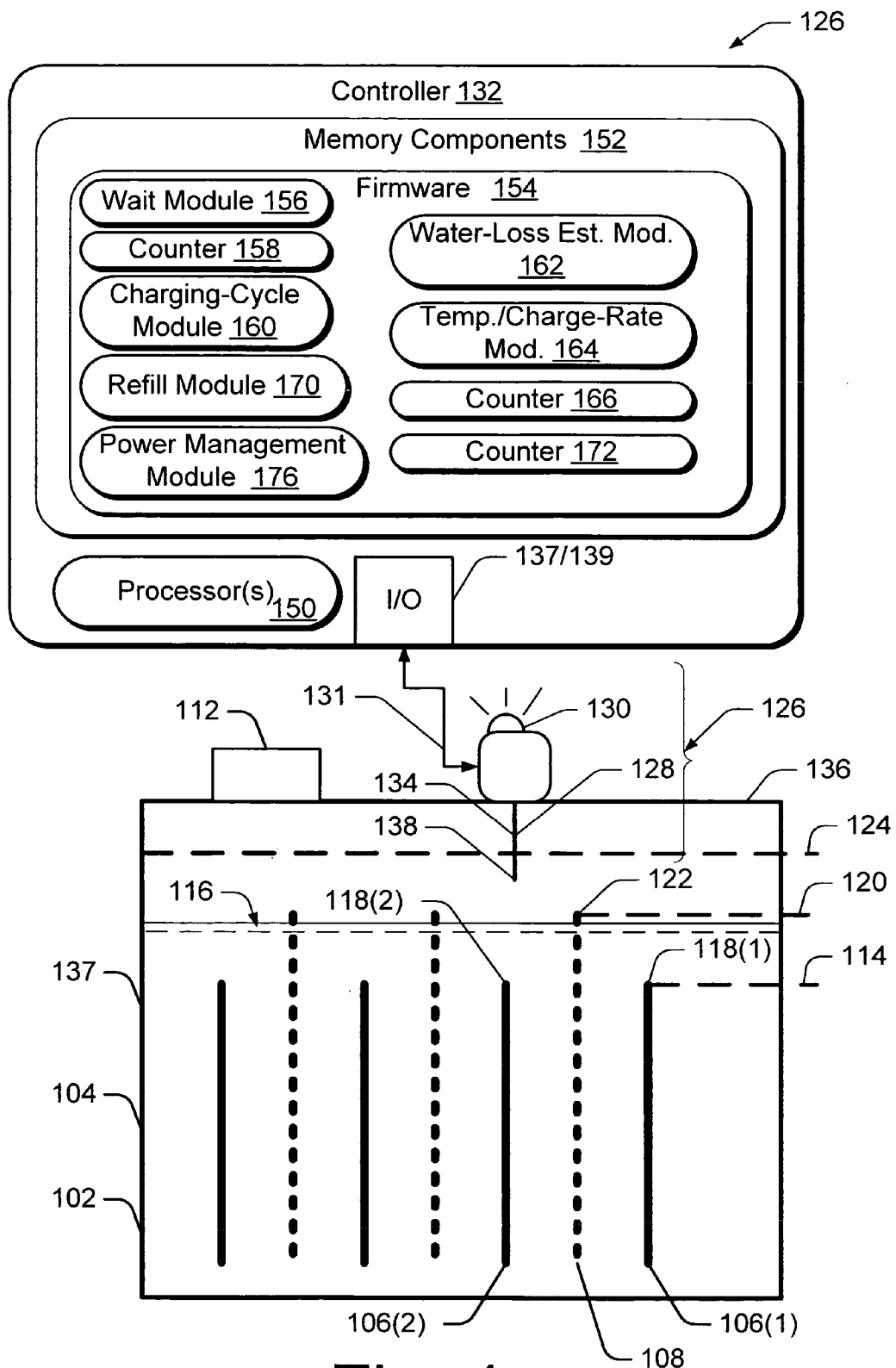
FIG. 1 illustrates a cross-sectional view of an exemplary aqueous battery in which it is desirous to monitor electrolyte levels therein.

FIG. 1 illustrates a cross-sectional view of an exemplary aqueous battery 102, such as a lead acid or nickel-cadmium battery, in which it is desirous to monitor electrolyte levels therein. Battery 102 includes: a container 104, a negative plate 106(1), a positive plate 106(2), a separator 108, and a vent 112. It is to be appreciated that additional components (not shown) can be included in battery 102. For example, additional plates, separators, vents, and so forth may be included in battery 102. Additionally, battery 102 may comprise additional cells that are not necessarily located in the same container 104. It is assumed that those skilled in the art are familiar with the basic components as well as the operational principles of an aqueous battery.

During charging of battery 102, water is electrolyzed to hydrogen and oxygen gases which exit container 104 via vent 112. The result is a gradual lowering of the electrolyte level in battery 102.

Exemplary Monitoring System

Accordingly, connected to battery 102 is a novel monitoring system 126 for monitoring the electrolyte level in battery 102. In the exemplary implementation, monitoring system 126 comprises a measuring device 128, an indicator 130, and a controller 132.

In one implementation, monitoring system 126 monitors three levels of electrolyte (electrolyte levels) in battery 102: a lowest electrolyte level 114, an interim level 120, and a highest level 124. The lowest electrolyte level 114 is the lowest safe level for electrolyte solution should be allowed to reach, which coincides to the tops 118(1) and 118(2) of the plates 106(1) and 106(2). Interim level 120 coincides with the top 122 of separator 108 and highest level 124 represents a maximum electrolyte height recommended by the manufacturer of the battery and is usually the level after the battery 102 has been refilled with water or some other type of solution. Other levels may also be monitored by the monitoring system 128.

Measuring device 128 may be any type of device configured to detect when the electrolyte level in the battery falls below a particular level. For example, in one implementation measuring device 128 comprises a probe 134 inserted through a hole (not shown) in the top 136 of container 104. Probe 134 senses whether its tip 138 is submerged in the electrolyte or the electrolyte level is below the tip 138 of probe 134. In other words, probe 134 is configured to detect whether the electrolyte level is above or below the particular level coinciding with tip 138, which in one implementation also coincides with the interim level 120. It is also possible that the particular level may coincide with other levels in the battery, higher than the interim level or potentially lower than the top 122 of separator 108.

In alternative implementations, probe 134 may be inserted from the side 137 of container 104 instead of the top 136. Additionally, it is also possible to have multiple probes located in battery 102 (whether from the side or top), for measuring the electrolyte levels in different cells and/or different electrolyte levels. It should be appreciated to those skilled in the art that the measuring device 128 may take various other forms, such as a strip, an optical sensor, or some other type of measuring device capable of sensing whether the electrolyte level falls below a particular level.

Indicator 130 is a device capable of providing an indication to people that the battery may need to be serviced. For instance, in one implementation, indicator 130 is a light that remains illuminated when the electrolyte level is satisfactory, and is turned-OFF, i.e., extinguished or deactivated, signaling that the time for refilling the battery is imminent. Alternatively, the light may be illuminated when it is time for refilling and deactivated when the electrolyte level is satisfactory.

In other implementations, it is also possible for the indicator to be configured to provide different types of indications as the electrolyte level approaches the lowest recommended electrolyte level 114. For example, the indicator 130 may provide a forewarning indication of a different color, such as yellow, indicating that the electrolyte level is quickly approaching the lowest recommended electrolyte level 114. A red light may then be illuminated when the electrolyte level actually reaches the lowest safe level, which coincides to the tops 118(1) and 118(2) of the plates 106(1) and 106(2).

In alternative implementations, indicator 130 may take various forms including: an audio alarm, a message displayed on a display device such as a user-interface on a dashboard, a message indicating whether the electrolyte level is satisfactory or not such as an e-mail message sent over a network, multiple lights having various potential colors, an analog or digital gauge showing a full and recommended refilling levels, a combination of any of the aforementioned formats, and other potential indicators.

Controller 132 is a control module that controls the operation of monitoring system 126, such as when to enable indicator 130 to signal (i.e., indicate) that the electrolyte level in the battery should be refilled. In one implementation, controller 132 is connected to measuring device 128 and indicator 130 via a link 131, such as a wired or wireless link. Accordingly, controller 132 is in "electrical communication" with measuring device 128 and indicator 130.

In one implementation, controller 132 includes one or more processor(s) 150 that can be configured to implement the inventive techniques described herein. Processor(s) 150 process various instructions to control the operation of the monitoring system 126 and possibly to communicate with other electronic and computing devices.

Controller 132 may also include one or more memory components 152 such as volatile or non-volatile memory (also collectively referred to as computer readable media). For example, controller 132 may include a firmware component 154 that is implemented as a permanent memory module stored in memory components 152. Firmware 154 is programmed and tested like software, and may be distributed with battery 102 (or separately on a disk or over the Internet such as in the form of an update). Firmware 154 can be implemented to coordinate operations monitoring system 126 such as controlling the indicator 130, and contains programming constructs used to perform such operations.

Thus, memory components 152 may store various information and/or data such as configuration information, operating parameters about the battery, charging information, and other information. For example, contained within memory components 152 are modules that contain code, such as in the form of firmware 154 and/or logic, used by controller 132 to monitor whether the electrolyte level is above or below a particular level.

It is to be appreciated that the components and processes described with reference to controller 132 can be implemented in software, firmware, hardware, or combinations thereof. By way of example, a programmable logic device (PLD) or application specific integrated circuit (ASIC) could be configured or designed to implement various components and/or processes discussed herein.

Controller 132 may include an input 137, which is one or more variety of components such as pin(s) on a microprocessor chip configured to receive one or more signals from measuring device 128. The signals indicate whether the electrolyte level in the battery is above or below a particular level, such as interim level 120. The signals themselves may be logical signals such as logical "one" indicating that the electrolyte level has dropped below the particular level and logical "zero" indicating that the electrolyte level is above a particular level, or vice versa.

Controller 132 may also include an output 139 configured to transmit a signal to indicator 130 to induce indicator 130 to provide an indication (visual and/or auditory) whether the electrolyte level in the battery 102 should be refilled or not and potentially other indications. Like input 137, output 139 represents one or more variety of components such as pin(s) on a microprocessor chip configured to transmit one or more signals.

Having introduced the various components of a exemplary battery and monitoring system 126, it is now possible to describe specific functionality provided by monitoring system 126.

Wait Period

Controller 132 receives a signal (either active high or active low) from measuring device 128 indicating when the electrolyte level in battery 102 has fallen below the interim level 120. At this point after the signal is received, controller 132 introduces a wait-period. The wait-period is intended to coincide with an approximate time it takes the electrolyte level to fall from the particular level above the separators to a level below the separators but above the tops 118(1) and 118(2) of the plates 106(1) and 106(2). Controller 132 introduces the wait-period without having to physically measure the electrolyte level, after the electrolyte level drops below the top 122 of separator 108. Accordingly, controller 132 waits for the wait-period to expire before enabling indicator 130 (e.g., an alarm, a light, a message, etc.) to indicate that the time for refilling the battery should be performed.

Controller 132 when used in conjunction with a measuring device eliminates the need to physically insert measuring devices below a separator 108 where there is a high likelihood of touching the separator 108 or making ionic contact with it. That is, monitoring system 126 provides an indication of the electrolyte level below a separator without risking touching the separators or making ionic contact with them. As such, a probe can be inserted in standard punch-out holes provided in the container 104 of battery 102. No drilling or lining-up of a measuring device 128 (such as a probe) with plates 106 is required, reducing labor costs and inconveniences associated with painstakingly attempting to insert the probe between the separators as may be the case with conventional solutions as described above in the Background.

Using a programmable controller 132 also facilitates providing an extremely low maintenance battery, i.e., a battery with very long watering intervals. The extra increment of time gained between water operations attained by introducing the wait-period in accordance with the novel implementations described herein, reduces the water intervals and adds commercial value to the battery. By allowing the electrolyte level to drop to the top of the plates 106, well below the tops of one or more separators, extends the water maintenance interval time over that of most batteries with conventional probe-based detection systems. In essence the battery is considered to be a lower maintenance battery.

In one implementation, controller 132 includes a wait-module 156 configured to introduce the wait-period after the signal is received from the measuring device 128 indicating that the electrolyte level in the battery has fallen below a particular level, such as the interim level 120.

In one implementation, the wait-period is a programmable period of time that may be predetermined and programmed into controller 132. The wait-period may include any period of time, but typically ranges from hours-to several days. For example, for most batteries it is anticipated that the wait-period will range from one or more days to about 50 days or more, before controller 132 enables indicator 130 to indicate that the time for refilling battery 102 has arrived.

Wait-module 156 may determine the wait-period several different ways. For instance, in one implementation, the wait-period is a programmable period of time. Controller 132 may comprise a counter 158 configured to countdown the programmable period of time to determine the wait-period.

According to another implementation, controller 132 may comprise a charging-cycle module 160, which is configured to monitor how many cycles of charging the battery experiences as a function of determining the wait-period, i.e., the period of time used by counter 158 to countdown. According to this implementation, controller 132 would be configured keep track of charging cycles.

According to another implementation, controller 132 may comprise a water-loss estimation module 162, configured to estimate a rate of electrolyte loss for the battery as a function of the age of the battery, and adjust the wait-period (i.e., the period of time used by counter 158 to countdown) accordingly. For example, water-loss estimation module 162 may take into account variable water consumption rates of old versus new batteries containing antimonial grids.

According to yet another implementation, controller 132 may comprise a temperature/charge-rate compensation module 164 to further estimate a wait-period.

Thus, the wait-period may be preset or be dynamically adjusted to account for various parameters, such as the age of the battery, temperatures, charging cycles, water-rate-loss, etc.

First and Second Wait Periods

According to still another implementation, controller 132 monitors the electrolyte level battery 102 to detect when the electrolyte level falls below a particular level, such as interim level 120. This time another wait-period is introduced called, a "first wait-period" when the electrolyte level in the battery is detected to have fallen below the particular level. The electrolyte level is then monitored to detect whether it rises back above the particular level during the first wait-period. If the electrolyte level in the battery does rise above the particular level during the first wait-period, then the first wait-period is reset (a counter is reset). However, if the electrolyte level in the battery does not rise above the particular level during the first wait-period, then a second wait-period (typically a longer "wait-period" such as described above) is introduced after the first wait-period expires. When the second-wait period expires, controller 132 enables indicator 130 to indicate that the electrolyte level in the battery should be refilled.

The first wait-period is designed to account for situations when measuring device 128 temporarily emerges from the electrolyte, such as when the battery is in motion or tilted on an angle. To ensure that this does not cause a false indication that the battery needs to refilled, the first wait-period is continually reset each time the probe reenters the electrolyte. Only after the first wait-period expires before being reset, i.e., when the measuring device 128 remains emerged from the electrolyte for the duration of the first-wait period, does the controller 132 initiate the second-wait period.

In one implementation, the first wait-period is a programmable period of time that may be predetermined and programmed into controller 132. The first wait-period may include any period of time, but typically ranges for only a few seconds to several minutes. For example, the first wait period may be set to start after about three seconds, and if the measuring device 128 does not remain the electrolyte for about 30 continuous seconds, then the second wait-period will be initiated.

Wait-module 156 may determine the "first wait-period" several different ways. For instance, in one implementation controller 132 may comprise a counter 166 configured to countdown the programmable period set for the first wait-period. For instance, counter 166 counts may be set to start after about three seconds (another counter, not shown, may be used to start the initial count period) and if the measuring device 128 does not remain the electrolyte for about 30 continuous seconds, then the second wait-period will be initiated. Otherwise, counter 166 will be reset if the measuring device 128 is re-immersed in electrolyte before reaching the end of the 30 second countdown period (i.e., the first wait-period).

Refill Wait-Period

According to another implementation, monitoring system 126 also monitors the electrolyte level in battery 102 when fluid is being added to battery 102. When the electrolyte level rises to a particular level, controller 132 introduces a refill-wait-period. If the electrolyte level is detected to remain at the particular level for the duration of the refill-wait-period, then controller 132 enables indicator 130 to indicate that the electrolyte level in the battery 102 has reached at least a desired level.

The refill-wait-period is programmable for a duration that may be used to account for accidental splashing of fluids on measuring device 128 when refilling the battery with fluid. For instance, a mere splash of acid onto a probe could reset the logic in controller 132 and enable the indicator 130 to indicate that the battery 102 is full. This may cause a maintenance operator servicing the battery to think that the cell(s) of the battery are full when they are not, which may cause confusion. Accordingly, an appropriate time delay (the refill-wait-period) configured in controller 132, ensures that the indicator does not indicate that cell(s) of battery 102 are full until measuring device 128 makes continuous contact with the electrolyte for the period of the time delay.

For instance, in one implementation controller 132 may also include a refill module 170 configured to introduce the refill-wait-period. In one implementation, the refill wait-period may be set for several seconds, i.e., such as two to ten seconds or enough to account for accidental splashing. A counter 172 may countdown the re-fill period to ensure that the electrolyte level makes continuous contact with the measuring device 128 before enabling controller 132 to enable indicator 130.

Power Management

According to yet another implementation, controller 132 may comprise a power management module 176 to control power supplied to the measuring device 128. That is, controller 132 selectively energizes and de-energizes the measuring device 128 over time. When the measuring device 128 is energized, a high current is supplied to the measuring device to reduce the probability of a false connectivity indication that the measuring device 128 is submerged in electrolyte, when in fact the electrolyte is below the electrolyte detection device. Periodically, switching between the energized and non-energized states enables the overall average current draw (or voltage draw) to remain relatively low over time despite supplying a high current (or voltage) to the measuring device device. Whereas, the relatively high current enables the current draw between direct and indirect paths to be large and easily distinguishable, therefore increasing the accuracy of electrolyte level detection without incurring a higher current draw.

In one implementation, the high current supplied to the measuring device is about approximately 100 milliamperes, however, the high current could also be greater or smaller. For instance, the high current could be less than 100 milliamperes, so long as the high current is distinguishable from the indirect current paths.

In one implementation, controller 132 selects (i.e., switches) between a test mode and a non-test mode. During the test mode, controller 132 energizes measuring device 128 to enable the measuring device 128 to ascertain whether the electrolyte level is above or below a particular level. During the non-test mode controller 132 deactivates (or de-energizes power to) measuring device 128. In one implementation, controller switches between the test mode and non-test mode about every second. However, during the period of the test mode controller 132 only requires a few milliseconds to determine the status of the measuring device 128, i.e., whether the electrolyte level is above or below the measuring device 128. Thus, energizing the measuring device 128 for only a few milliseconds before de-energizing it, allows current draw over time to remain on average at about five milliamperes, or equivalent to constantly energizing the measuring device 128 with a smaller current.

Although controller 132 is shown to include various distinct functional blocks (a wait module 156, a water-loss estimation module 162, a refill module 170, etc.), it is understood that when actually implemented in the form of computer-executable instructions, logic, firmware, and/or hardware, that the functionality described with reference to each block may not exist as separate identifiable modules. Controller 132 may also be integrated with other components or as a module in a larger system.

Exemplary Implementations of Control Module

Figure 2:
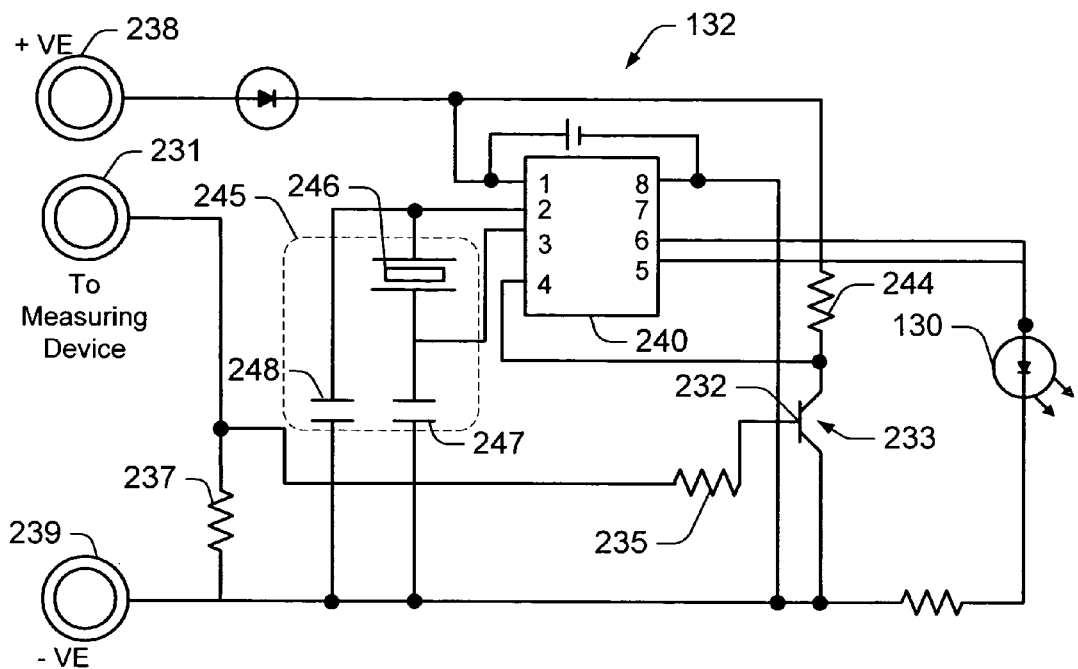
FIG. 2 illustrates a schematic diagram of an exemplary implementation of a controller shown in FIG. 1.

FIG. 2 illustrates a schematic diagram of an exemplary implementation of the controller 132 shown in FIG. 1. Referring to FIG. 2, an input 231 of the controller 132 is coupled to a measuring device 126 (FIG. 1). Input 231 is coupled to the base 232 of transistor 233 across resistor 235 and is also coupled across resistor 237 to terminal 239, which is coupled to −VE potential of battery 102.

Resistor 237 serves as a current to voltage translator, creating a voltage drop across resistor 237 when current flows from input 231 to terminal 239. Resistor 235 serves to limit the amount of current that flows to base 232 of transistor 233.

When measuring device 128 (FIG. 1) is immersed in the electrolyte contained in container 104 (FIG. 1), the electrolyte functions to close the circuit between first input 231 and terminal 239. This creates a voltage drop across resistor 235 sufficient to drive transistor 233 into saturation. When transistor 233 is on, the circuit path from terminal 238 to terminal 239 is closed through resistor 244. This results in causing a low level logic or logical zero being applied to pin 4 of a microcontroller 240.

When measuring device 126 is not immersed in the electrolyte, the circuit between input 231 and terminal 239 is opened. This causes the potential between the base 232 of transistor 233 and the drain of terminal of transistor 233 to become zero and transistor 233 turns off. This will cause pin 4 of microcontroller 240 to realize an input voltage equal to terminal 238 i.e., +VE. This is equivalent of a logical one provided to pin 4.

Microcontroller 240 is programmed to recognize the change from a logical zero to a logical one on pin 4 as an indication that the measuring device 126 is no longer immersed in the electrolyte in battery 102, and control indicator 130 (which in this implementation comprises two LEDs), which is coupled to microcontroller 240 after one or more wait-periods according to preprogrammed set of conditions.

In the exemplary implementation illustrated in FIG. 2, microcontroller 240 is a 12F629 chip manufactured by Microchip of Chandler, Ariz., USA. It is, however, understood that one of skill in the art would appreciate that numerous chips and/or other devices could be used in place of this specific microcontroller 240.

A clock circuit 245 comprising a crystal controlled clock 246 and a set of capacitors 247 and 248 facilitate control of indicator 130 by microcontroller 240. Clock circuit 245 provides the time mechanism required to allow microcontroller 240 to control indicator 130 in accordance with preprogrammed conditions.

Figure 3:
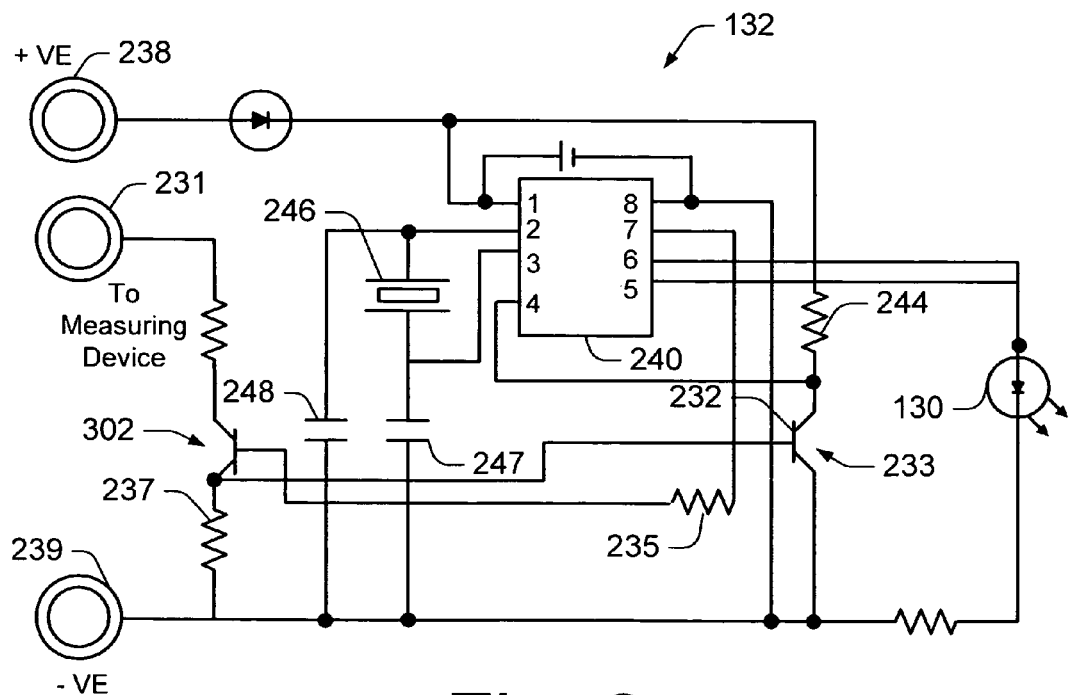
FIG. 3 illustrates an alternative schematic diagram of another exemplary implementation of the controller shown in FIG. 1.

FIG. 3 illustrates an alternative schematic diagram of another exemplary implementation of controller 132 shown in FIG. 1. FIG. 3 includes the addition of a switch 302 coupled to both the microcontroller 240 and measuring device 128. Microcontroller 240 operates in a selectable test mode and non-test mode. When microcontroller 240 selects the test mode, microcontroller 240 enables power to be supplied to measuring device 128. That is, the microcontroller 240 causes the switch 302 to couple the power supply +VE/−VE to measuring device 128 when the microcontroller is in the test mode, which energizes the measuring device and allows microcontroller 240 to determine whether the electrolyte level in the battery is above or below a particular level. When in the non-test mode, microcontroller 240 disconnects (de-couples) measuring device 128 enabling the measuring device 128 to be de-energized. Repetitively switching between the test mode and the non-test mode causes the measuring device to be energized and de-energized repetitively over time, which allows a high current to be supplied to the measuring device 128, when in the test mode.

Methods of Operation

Figure 4:
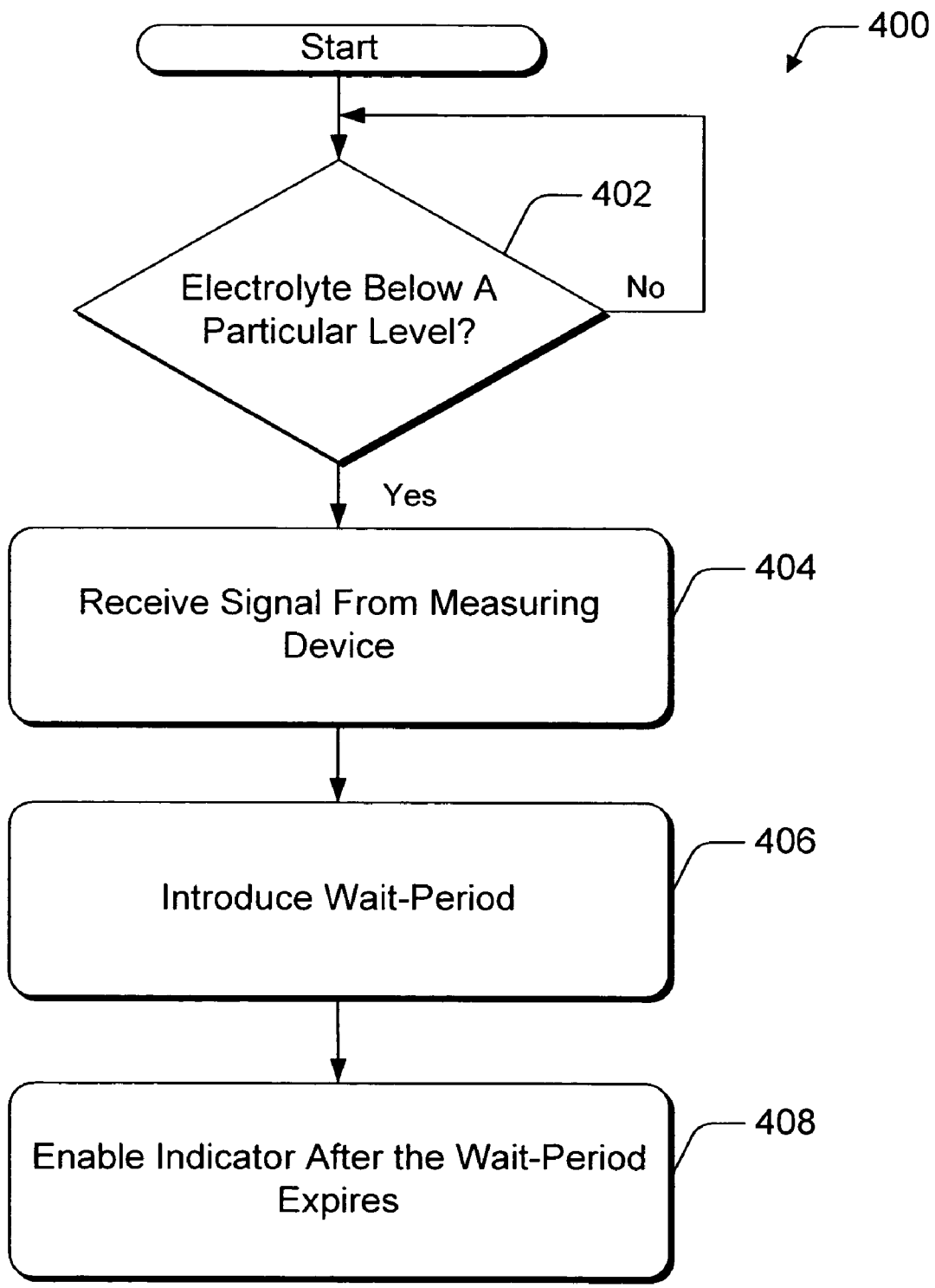
FIG. 4 illustrates an exemplary method for monitoring electrolyte levels in a battery.

FIG. 4 illustrates an exemplary method 400 for monitoring electrolyte levels in a battery. Method 400 enables the electrolyte levels to be monitored below the tops of separators in a battery without having to actually insert a sensor below the separators. Method 400 includes blocks 402, 404, 406 and 408 (each of the blocks represents one or more operational acts). The order in which the method is described is not to be construed as a limitation, and any number of the described method blocks can be combined in any order to implement the method. Furthermore, the method can be implemented in any suitable hardware, software, firmware, or combination thereof.

In a decisional block 402, the electrolyte level in the battery is monitored to detect whether it falls below a particular level. For example, controller 132 (FIG. 1) detects whether tip 138 (FIG. 1) of probe 134 (FIG. 1) is submerged in the electrolyte or the electrolyte level is below the tip 138 (FIG. 1), which generally coincides with a level the top 122 (FIG. 1) of separator 108 (FIG. 1) in battery 102 (FIG. 1). If the electrolyte level is not below the particular level, then according to the NO branch of decisional block 402, method 400 loops back and continues to monitor the electrolyte level. If the electrolyte level falls below the particular level, then according to the YES branch of decisional block 402 method 400 proceeds to block 404.

In block 404, if the electrolyte falls below the particular level a signal is received by the controller 132 (FIG. 1) indicating that electrolyte level is below the particular level.

In block 406, a wait-period is introduced when the electrolyte level in the battery 102 is detected to have fallen below a particular level. For example, controller 132 starts a counter 158 that counts down a particular period of time.

In block 408, a warning is made that the electrolyte level in the battery should be refilled after the wait-period expires. For example, controller 132 sends a signal to indicator 130 enabling it to indicate (light, sound an alarm, display a message, etc.) that water should be added to battery 102.

Figure 5:
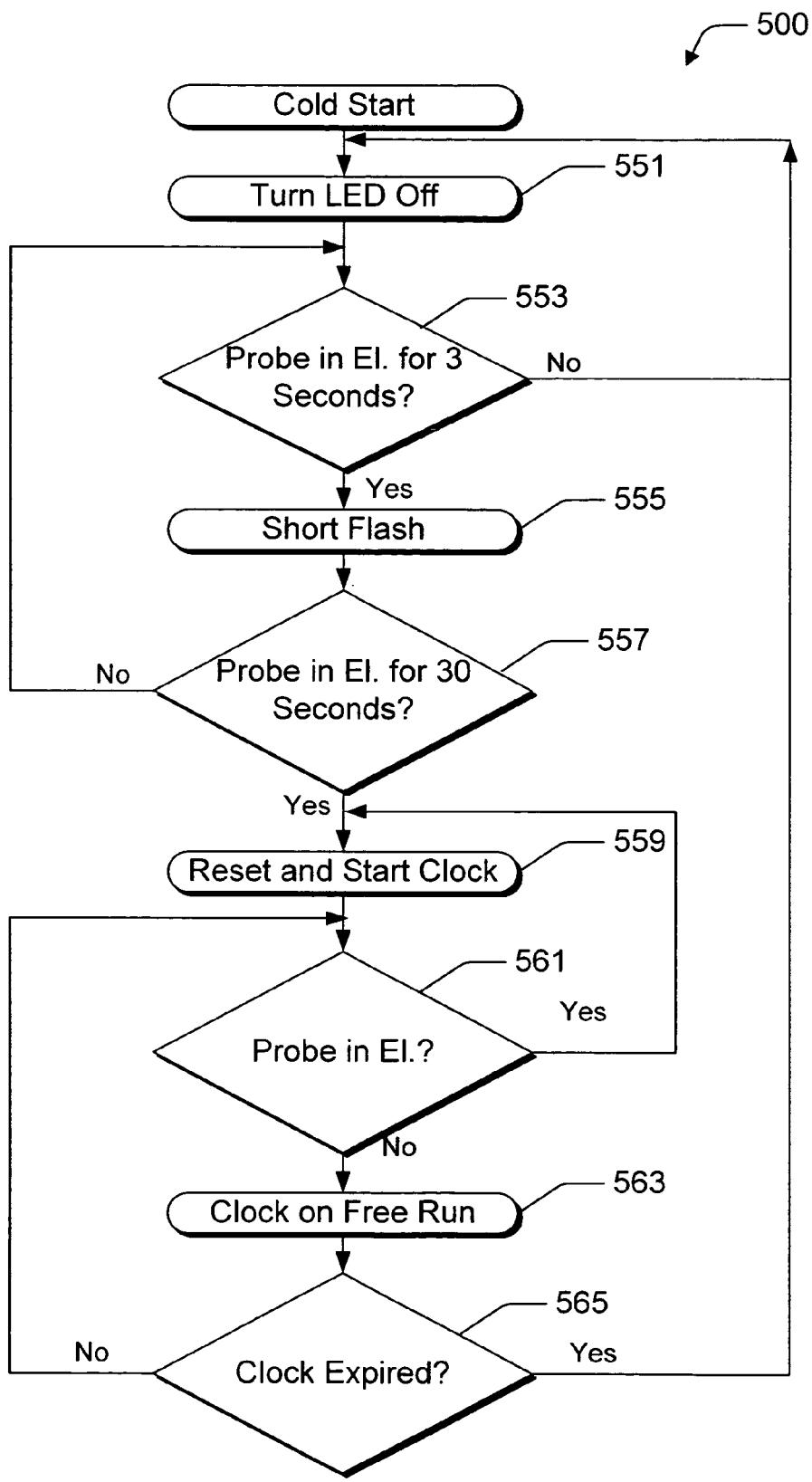
FIG. 5 illustrates a more detailed exemplary method for monitoring electrolyte levels in a battery.

FIG. 5 illustrates a more detailed exemplary method for monitoring electrolyte levels in a battery. Method 500 includes blocks 551, 553, 555, 557, 559, 561, 563 and 565 (each of the blocks represents one or more operational acts). The order in which the method is described is not to be construed as a limitation, and any number of the described method blocks can be combined in any order to implement the method. Furthermore, the method can be implemented in any suitable hardware, software, firmware, or combination thereof.

In block 551 an indicator is turned-OFF (in this example when the indicator is turned-OFF it is actually enabled—meaning that the electrolyte level needs to be refilled). In a decisional block 553 a determination is made whether a measuring device has been in the electrolyte for a short period time, such as several seconds. If according to the YES branch of decisional block 553, the measuring device has been immersed in the electrolyte for the short period of time (e.g., three seconds), method 500 proceeds to block 555. If according to the NO branch of decisional block 553, the measuring device has not been immersed in the electrolyte for the short period of time, then method 500 proceeds back to block 551.

In block 555 an indicator is enabled. For example, a light (e.g., light emitting diode) is turned-ON, meaning the indicator is actually indicating that the electrolyte level is satisfactory and does not need to be refilled.

In a decisional block 557, a determination is made whether the measuring device remains immersed in the electrolyte for another short duration of time. For example, a determination is made whether the measuring device 128 (FIG. 1) remains in the electrolyte for thirty continuous seconds. If according to the NO branch of decisional block 557, if the measuring device does not remain in the electrolyte, method 500 proceeds to block 553. If according to the YES branch of decisional block 557, if the measuring device does remain the electrolyte, method 500 proceeds to block 559.

In block 559 a timer for a clock is initiated, i.e., a counter starts counting down the wait-period. However, according to the YES branch of decisional block 561, if the measuring device remains in the electrolyte the counter will either be reset or will not count-down, and method 500 returns to block 559.

If according to the NO branch of decisional block 561, if the measuring device does not remain in the electrolyte, method 500 proceeds to block 563 and the counter counts down the wait-period, (whether predetermined or dynamically chosen depending on various parameters such as age of the battery, charging cycles, water loss rate, etc.).

Once the wait-period expires, e.g., counter finishes counting down the wait-period, method 500 proceeds to block 551 and turns-off indicator 130 (e.g., enables indicator to indicate that aqueous solution should be added to battery 102 because the electrolyte level has most likely reached the tops of the battery plates.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system for monitoring the electrolyte level in a battery having one or more separators between positive and negative plates in a cell of the battery, the one or more separators having a top which is at a level that is higher than a top of the plates, said system comprising:
    a measuring device, suitable to be located in said battery, configured to detect when the electrolyte level in the battery falls below a first level which is above the tops of the separators in said battery; and
    a controller, in electrical communication with the measuring device, configured to (i) receive a signal from the measuring device indicating when the electrolyte level in the battery has fallen below said first level, (ii) introduce a wait-period after the signal is received, and (iii) enable an indicator to indicate that the electrolyte in the battery should be refilled after the wait-period expires;
    wherein said wait-period represents an appropriate time it takes the electrolyte level to fall from said first level to a second level which is below the tops of said separators and above the tops of said plates.

2. The system as recited in claim 1, wherein during the wait-period the controller is further configured to enable the indicator to indicate that the electrolyte level in the battery is approaching said second level as a forewarning to actually providing the indication that the electrolyte level in the battery should be refilled.

3. The system as recited in claim 1, wherein the wait-period is a programmable period of time.

4. The system as recited in claim 1, wherein the controller comprises a counter configured to count down a programmable period of time comprising the wait-period.

5. The system as recited in claim 1, wherein the controller comprises a charging-cycle module configured to monitor the number of cycles of charging the battery experiences after said signal is received and wherein said wait-period is a function of said number of cycles of charging.

6. The system as recited in claim 1, wherein the controller comprises a water-loss estimation module, configured to estimate a rate of electrolyte loss for the battery as a function of the age of the battery, and adjust the wait-period accordingly.

7. The system as recited in claim 1, wherein the indicator is one or more lights that are activated to signify that the electrolyte level in the battery should be refilled.

8. A battery, comprising:
one or more cells having disposed therein positive and negative plates, a separator disposed between said positive and negative plates, and a liquid electrolyte within said cells having an electrolyte level, said separator having a top which is at a level above a top of said positive and negative plates;
a probe, located in at least one of said battery cells, configured to detect when said electrolyte level falls below a first level which is above the tops of said separators;
an indicator; and
a controller, in electrical communication with the probe, configured to (i) receive a signal from the probe indicating when the electrolyte level in the battery has fallen below said first level, (ii) introduce a wait-period after the signal is received, and (iii) enable the indicator to signify that the electrolyte in the battery should be refilled when the wait-period expires;
wherein said wait-period is chosen to allow the electrolyte level to fall from said first level to a second level which is below the tops of said separators and above the tops of said positive and negative plates.

9. The battery as recited in claim 8, further comprising an electrical circuit connecting the controller to the probe, the electrical circuit configured to enable the signal to be sent to the controller when the probe detects that the electrolyte level is below said first level.

10. The system as recited in claim 1, further comprising:
means for receiving the signal from the measuring device indicating whether the electrolyte level in the battery is above or below the measuring device; and
means for repetitively energizing and de-energizing the measuring device over time.

11. The system as recited in claim 10, wherein the means for repetitively energizing and de-energizing the measuring device over time comprises the controller.

12. The system as recited in claim 10, wherein the means for receiving the signal from the measuring device is an input terminal of the controller.

13. The battery as recited in claim 8, further comprising:
means for receiving the signal from the probe indicating whether the electrolyte level in the battery is above or below the probe; and
means for repetitively energizing and de-energizing the probe over time.

14. The battery as recited in claim 13, wherein the means for repetitively energizing and de-energizing the probe over time comprises the controller.

15. The battery as recited in claim 13, wherein the means for receiving the signal from the probe is an input terminal of the controller.

16. A system for monitoring the electrolyte level in a battery having one or more separators between positive and negative plates in a cell of the battery, the separator having a to that is at a level which is higher than a to of the plates, said system, comprising:
a measuring device for detecting when an electrolyte level in the battery falls below a first level which is above said top of said one or more separators, said measuring device comprising a probe positioned at said first level; and
a controller, in electrical communication with the measuring device, configured to (i) receive a signal from the measuring device indicating when the electrolyte level in the battery has fallen below said first level, (ii) introduce a wait-period after the signal is received, the wait-period being chosen to allow the electrolyte level to continue to fall to a second level which is below the tops of said separators and above the tops of said plates, and (iii) enable an indicator to indicate that the electrolyte in the battery should be refilled after the wait-period expires.

17. A system for monitoring the electrolyte level in a battery having a separator between positive and negative plates in a cell of the battery and a lowest recommended electrolyte level which is above the positive and negative plates, the separator having a top which is at a level that is higher than the lowest recommended electrolyte level, said system comprising:
a measuring device, located in said battery, configured to detect when the electrolyte level in the battery falls below a first level which is above the to of said separator;
a controller, in electrical communication with the measuring device, configured to (i) receive a signal from the measuring device indicating when the electrolyte level in the battery has fallen below the first level, (ii) introduce a wait-period after the signal is received, and (iii) enable an indicator to indicate that the electrolyte in the battery should be refilled after the wait-period expires; and
wherein said wait-period is chosen to allow the electrolyte level to fall from said first level to a second level which is below the top of said separator and no lower than said lowest recommended electrolyte level.

* * * * *